July 10, 1934.  J. H. ASHBAUGH ET AL  1,966,232
REGULATING SYSTEM
Filed June 17, 1932   2 Sheets-Sheet 1
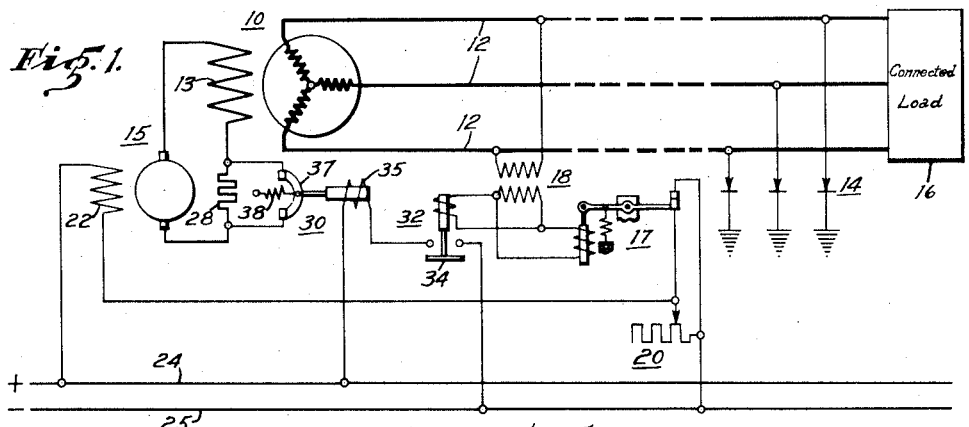
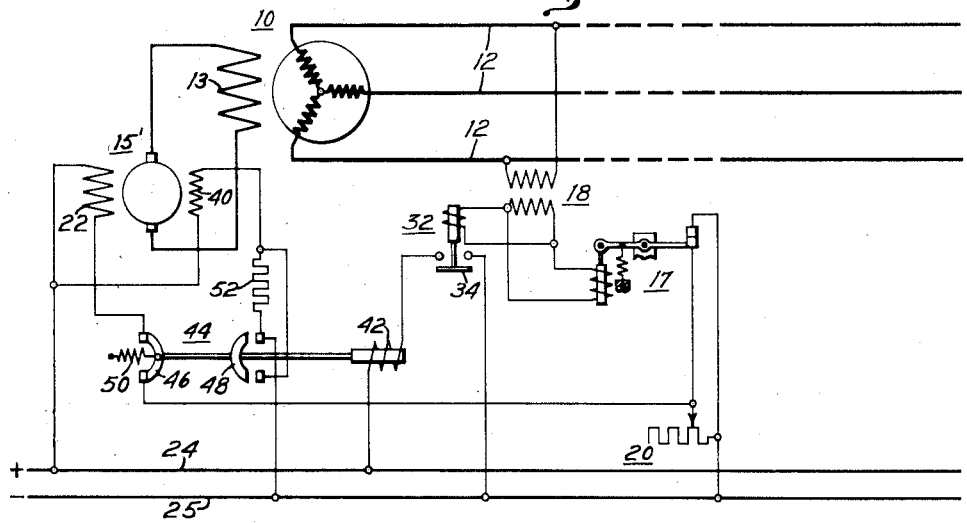
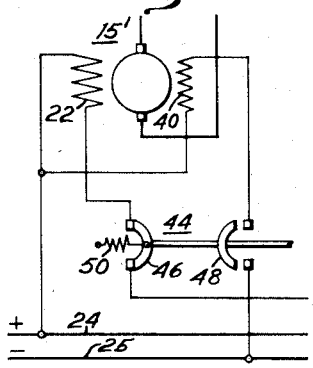
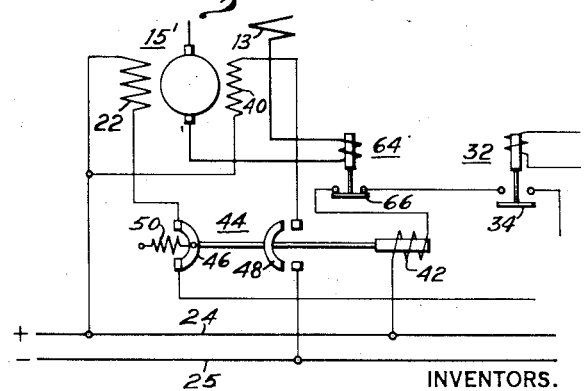
WITNESSES:
INVENTORS.
John H. Ashbaugh and
Alexander C. Monteith.
BY
Franklin E. Hardy
ATTORNEY

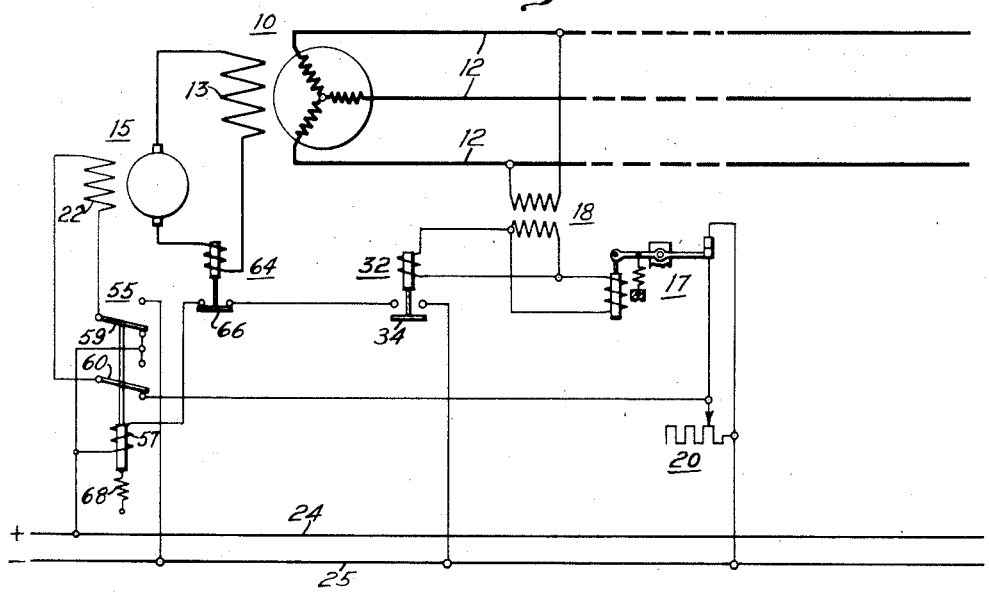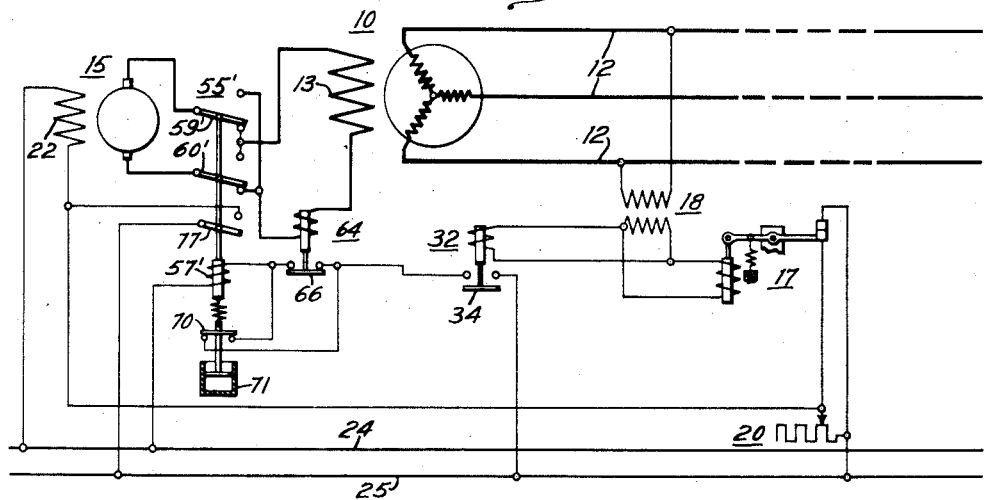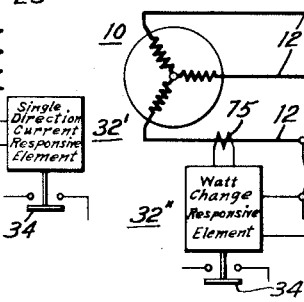

Patented July 10, 1934

1,966,232

UNITED STATES PATENT OFFICE 1,966,232

REGULATING SYSTEM

John H. Ashbaugh, Longmeadow, Mass., and Alexander C. Monteith, Wilkinsburg, Pa., assignors to Westinghouse Electric & Manufacturing Company, East Pittsburgh, Pa., a corporation of Pennsylvania Application June 17, 1932, Serial No. 617,794

6 Claims. (Cl. 171—229)

Our invention relates to regulating systems and has particular relation to systems employing means for limiting the voltage rise of rotating electrical machinery to a safe value.

Total or partial loss of load on electrical generators frequently results in an undesirable voltage rise. This is most pronounced when the generators are of the alternating-current type connected to long transmission lines having high charging currents, or when the prime mover governors are incapable of preventing overspeed when load is suddenly removed. In the absence of adequate preventive means, the "run-way" voltage may, in practice, reach a dangerously high value. Similar conditions also obtain when synchronous condensers are used on long transmission lines and load is suddenly dropped.

In such cases, it is desirable to limit this voltage rise in order to avoid overstressing the insulation of the machines and connected apparatus, which apparatus includes power transforming equipment, transmission line insulators, lightning arresters, and connected load equipment etc., all of which, in any power system, must be capable of withstanding the maximum voltage to which that system is subjected.

In the past, this voltage-rise has sometimes been limited by the use of overvoltage, overspeed, or overfrequency relays which automatically regulate the field circuit or trip the machine from the line or bus when the voltage or speed reaches a predetermined value. While this is a very effective way of limiting the overvoltage it has the disadvantage of allowing the abnormal condition to remain on the system too long or of making necessary the resynchronization of the different machines in a station to get them back into service. Our invention is directed to a solution of these problems which overcomes the disadvantages named and which possesses additional advantages to be particularized hereinafter.

An object of our invention is to provide means for limiting the voltage rise of dynamo-electric machines to a safe value.

Another object of our invention is to provide a system of the type described which is effective in counteracting the voltage increasing effects of generator overspeed resulting from loss of load and magnetizing action of line charging current.

A further object of our invention is to provide means for very rapidly reducing the excitation of a dynamo-electric machine when its voltage attains a predetermined excessive value.

A still further object of our invention is to provide means for holding within reasonable limits, the voltage on an electrical generator, power station, or synchronous condenser at times when full load is suddenly lost without deenergizing the field circuits of the machines or tripping them from the line or bus.

In practicing our invention, we provide means responsive to a predetermined value of overvoltage for reducing the machine excitation at a rate which is sufficiently rapid to counteract the voltage increasing effects of generator overspeed and of line charging current. It will be recognized that the speed of response of voltage regulators which are ordinarily associated with machines of the type under consideration is insufficient to accomplish this purpose.

Our invention, which may be used with voltage regulators, comes into action under emergency overvoltage conditions and acts independently of the regulator to effectively limit the voltage rise. Its use, therefore, in addition to making possible the design of lightning arresters and protective apparatus to give better protection without being subject to failure on overdynamic voltage, minimizes the stresses on system insulation and protects the connected-load equipment from severe overvoltage, which in the case of certain apparatus such as incandescent lamps, results in material reduction in life.

Our invention will best be understood through the following description of specific embodiments thereof when taken in conjunction with the accompanying drawings in which:

Figure 1 is a diagrammatic view of apparatus and circuits schematically illustrating one embodiment of our invention.

Fig. 2 is a diagrammatic view of apparatus and circuits illustrating a second embodiment of our invention applied to an alternating-current machine employing an exciter having a main and a differential field winding.

Fig. 3 is a diagram illustrating an alternative connection for the differential field winding of a main exciter which comprises a part of the system of Fig. 2.

Fig. 4 is a diagram illustrating the manner in which a machine-excitation responsive relay may be employed with the systems of Figs. 2 or 3 to prevent the field winding current from being reduced below a given minimum value.

Fig. 5 is a diagram illustrating a third embodiment of our invention applied to an alternating-current machine employing a main exciter.

Fig. 6 is a diagram illustrating a modification of the system of Fig. 5 in which the reversing switch is connected intermediate the main exciter and the machine field winding instead of in the exciter-field-winding circuit.

Fig. 7 is a diagram illustrating a relay which is responsive to changes in the field current of the machine protected for initiating excitation reduction in the systems of our invention, and Fig. 8 is a similar diagram illustrating a relay which is responsive to changes in the loading of the machine protected for initiating excitation reduction in the systems of our invention.

Referring to the drawings, and particularly to Fig. 1 thereof, a dynamo-electric machine 10, the voltage of which is to be limited, is shown as comprising armature windings connected to the conductors of a transmission line 12 and a field winding 13 that is connected to be energized from an excitating generator 15. The machine 10 may be a generator of either the direct-current or, as shown, of the alternating-current type, which is subject to overspeed upon loss of load, or to the magnetizing effects of line charging current, or it may be a synchronous condenser or other dynamo-electric machine which, at any time, may be subjected to sudden overvoltage. Connected with transmission line 12 are lightning arresters 14 and load equipment 16 whose insulation might be damaged by excessive overvoltage of the machine 10.

In the system illustrated in Fig. 1, a voltage regulator 17, influenced by the potential of machine 10 through a voltage transformer 18, is disposed to act upon a current-adjusting rheostat 20 in the energizing circuit of the exciter field winding 22. This circuit may be supplied from any suitable source of direct current, such as is represented by conductors 24 and 25 which are assumed to be maintained at a substantially constant potential difference. Inasmuch as the voltage regulator 17 forms no part of our invention and as such devices are well known in the art, only a very simplified showing of its details has been made. It will be understood that in practice this regulator may be either of the vibrating or of the rheostatic type.

In the event that the machine 10 is caused to overspeed as upon a sudden dropping of load, or if it is subjected to large values of transmission line charging current having a leading power factor, or to a combination of both influences, the voltage of the machine rises, as has been mentioned, to values which in practical installations may attain excessively high magnitudes in spite of the corrective action of the usual type of voltage regulating device indicated at 17.

To protect the insulation of the machine and that of the connected apparatus, the system of our invention shown in Fig. 1 functions to insert a resistor 28 into the field-winding circuit of the machine and to thereby rapidly build down the excitation. Preferably this insertion is accomplished through the use of a switch or circuit breaker 30 which, in the normally closed position illustrated, short circuits the resistor 28 thereby in effect removing it from the machine excitation circuit.

When the machine voltage rises to a predetermined excessive value an overvoltage relay 32 that is connected, through potential transformer 18, to be responsive to the generator voltage, biases a contact member 34 upwardly to complete an energizing circuit for an actuating winding 35 of switch 30. So long as this winding is energized, the movable contact member 37 of the switch will be biased to the right against the action of a tension spring 38 to thus remove the short circuit from the excitation-circuit resistor 28.

The resistance value of the resistor 28 will be chosen in accordance with the speed with which it is desired to build down the flux in the main machine. When this resistance value is properly coordinated with the characteristics of the machine field winding 13, the rate of flux decrease may be made exceedingly rapid. Devices 32 and 30 may be of a type which require but very little time for operation so that once the machine voltage has reached the predetermined excessive value, insertion of the resistor in the machine excitation circuit is almost instantaneous. The subsequent building down of machine flux first decreases very rapidly and then tapers off, following the well known exponential curve of current decay that applies to a circuit containing a series connected resistance and inductance.

Once the machine voltage is reduced to a value below that to which relay 32 is responsive, the actuating winding 35 of breaker 30 is de-energized and the breaker recloses to re-establish the short circuit around the resistor 28, to thereby restore the machine-excitation circuit to normal control. This method of automatically inserting resistance is found to be very effective in keeping the voltage within desired limits when load is lost.

Overvoltage protection may also be accomplished through the utilization of the scheme shown in Fig. 2, which illustrates a second embodiment of our invention. This scheme is shown in combination with an alternating-current machine 10 connected with the transmission line 12, as in Fig. 1, and excited by a direct current generator 15′ which is provided with a differential field winding 40 in addition to the main field winding 22.

During normal operation of the machine, the voltage regulator 17 controls, in the manner already explained, the voltage of machine 10 by adjusting the main field winding current of the exciter 15′. Upon the occurrence of overvoltage, relay 32 completes, through contact member 34, an energizing circuit for actuating winding 42 of a double-pole switch or breaker 44. As a result contact members 46 and 48 of this switch are biased to the right against the action of a tension spring 50 which normally holds member 46 in the closed position to complete the energizing circuit of main field winding 22 of the exciter. When so actuated, however, member 46 opens this circuit and member 48 closes a circuit which serves to increase the energization of differential field winding 40 of the exciter.

In the connection shown in Fig. 2 this differential field winding 40 is normally energized through a resistor 52 which resistor is short circuited by the closure of contact member 48 of switch 44. If desired, however, the differential field winding 40 may normally be de-energized and influenced by current only upon the actuation of switch 44. In such a situation the connections illustrated in Fig. 3 would be utilized, it being noted that in Fig. 3 contact member 48 serves to directly complete the energizing circuit of the differential field winding of the exciter.

In either case the increase in bucking flux supplied by this differential field winding of the exciter 15′ serves to rapidly reduce the exciter voltage which is impressed upon the machine field winding 13 so that the machine excitation is accordingly reduced at a rapid rate. By properly proportioning the ampere turns of the differential winding 40 with respect to those of the main field winding 22 of the exciter, the speed of voltage decrease may be made very rapid, and the range may be so extended as to cause the exciter to reverse its voltage should such reversal be justified in the interests of further increasing the speed of building down the flux in the main machine and limiting the overvoltage of the machine. It will be apparent, therefore, that this method of control is exceedingly effective and flexible.

In the event that the exciter is designed to permit of voltage reversal, means for preventing the machine field current from being completely reduced to zero are of utility to prevent the machine 10 from falling out of synchronism. Such means may take the form shown in Fig. 4 in which a current relay 64 is utilized to interrupt, by means of a contact member 66, the actuating circuit of switch 44, when the current in the circuit of machine field winding 13, in which relay 64 is disposed, is reduced to a predetermined low value.

When the voltage of alternator 10 has been reduced to a value below that to which overvoltage relay 32 is responsive, or when the machine field current drops sufficiently to actuate relay 64, the actuating circuit of switch 44 is interrupted and the switch is allowed to return to the normal position illustrated in which the energizing circuit of main field winding 22 of the exciter is reestablished and the energization of differential field winding 40 is either reduced, as in the system of Fig. 2, or completely interrupted as in the case shown in Fig. 3. The voltage regulator 17 then resumes its control of the machine voltage by acting upon the exciter-field winding 22.

For situations in which it is desired to obtain high speeds in bucking down the machine field in order to keep overvoltage within safe limits, the systems shown in Figs. 5 and 6 may also be utilized. In these systems means for completely reversing the excitation supply voltage are utilized.

In the form of our invention shown in Fig. 5 a reversing switch 55 is connected intermediate the exciter field winding 22 and energizing conductors 24 and 25. Upon the occurrence of overvoltage of the machine 10, relay 32 actuates to complete an energizing circuit for the switch operating winding 57 which biases the switch blades 59 and 60 upwardly thereby reversing the polarity of energizing voltage impressed upon the winding 22. This rapidly reduces the voltage of the exciter 15 causing it to pass through zero and build up in the opposite direction to a value equal to or greater than its original normal operation value, switch 55 in its reversed positon removing voltage regulator rheostat 20 from the circuit. This voltage reversal acts in the manner already explained to rapidly reduce the machine flux and thereby keep the voltage from rising excessively.

In order that the machine field current may not be brought entirely down to zero, a current relay 64 before mentioned in connection with the description of Fig. 4, is utilized in the manner shown to interrupt, by means of contact member 66, the actuating circuit of switch 55 when the current in the circuit of field winding 13, in which relay 64 is disposed, falls to a predetermined low value. This precaution is taken in order to prevent the alternator 10 from falling out of synchronism.

Interruption of the switch actuating circuit allows the blades of switch 55 to return to the normal position illustrated, under the action of gravity assisted by the force of a tension spring 68. This restores the polarity of the exciter-field-winding energizing voltage to its normal value and reinserts voltage regulator rheostat 20 into the field winding circuit thereby restoring normal regulator control.

In the modification of Fig. 6 the reversing switch 55' is disposed intermediate the exciter 15 and the machine field winding 13 to provide a direct reversal of the machine excitation upon the occurrence of overvoltage. As in the system of Fig. 5 the actuating circuit of the reversing switch is controlled by means of overvoltage relay 32, the circuit including contact member 66 of overcurrent relay 64 which is responsive to the machine exciting current.

In order to prevent an interruption of the reversing switch actuating circuit during the time required for the switch blades 59' and 60' to be moved upwardly to the reversed position, a special bridging contact member 70 may be provided to shunt the overcurrent relay contact member 66. Member 70 remains in engagement until the switch operation has been completed and energization of relay 64 reestablished to return its contact to the closed position. This having been accomplished, member 70 is permitted, by time delay means 71, to move upwardly into a disengaged position thereby allowing overcurrent relay contacts 66 to interrupt the switch actuating circuit when the machine exciting current falls to a predetermined low value.

Preferably reversing switch 55' is provided with an auxiliary blade 77 which serves to short circuit regulator rheostat 20 when the switch is in the reverse-polarity position.

As in the system of Fig. 5, interruption of the energizing circuit for which actuating winding 57' allows the switch to return to the normal position shown placing the machine back into normal control. It will be apparent that when the reversing switch is placed in the position shown in Fig. 6 it is subjected to much heavier current carrying and circuit establishing duty than when placed in the position shown in Fig. 5. Inasmuch as the speed of response of the system of Fig. 6 is somewhat higher than that of Fig. 5, the additional capacity and ruggedness of the switch will, however, in certain situations, be justified.

In the systems thus far described, excitation reduction has been initiated by means of an overvoltage relay influenced by the machine potential. While this is a very effective method, it is not the only one which may successfully be utilized, as will be apparent from a consideration of the diagrams of Figs. 7 and 8 in which other methods of initiation are illustrated.

In a dynamo-electric machine of the type represented at 10 a change in terminal voltage resulting from a sudden change of load produces, as is known, a comparable fluctuation in the machine field winding current. Field-current fluctuations resulting from sudden dropping of load may, therefore, be utilized, by actuating a relay which is properly designed to be responsive to them, to initiate an excitation-reduction in the same manner as does voltage responsive relay 32 already described. In Fig. 7 such a combination is shown as comprising a relay 32' having an element, for actuating contact member 34, which is responsive to current flow in one direction only. This element is connected with a current transformer 73 disposed in the machine field winding circuit in such manner that current fluctuations resulting from sudden dropping of load causes relay 32' to actuate. Current transformer 73 should be of a type designed to continuously carry direct current without over heating or over saturating its magnetic circuit.

It will be apparent that the relay 32' shown in Fig. 7 may be substituted for over-voltage relay 32 in all of the systems of our invention which have been described, to cause the voltage reducing means to come into action upon the occurrence of a given fluctuation in machine field current resulting from sudden load drop.

A third method of initiation is illustrated in Fig. 8 in which a watt-change-responsive relay 32'' is shown as being influenced by the loading of machine 10. The element of this relay is preferably disposed to be responsive to sudden dropping of load only, in order that excitation reduction occasioned by the closure of contact member 34, may be initiated only when the load change would tend to allow the voltage to rise. As illustrated, the relay is energized through voltage and current transformers 18 and 75.

It will be evident that relay 32'' of Fig. 8 may be substituted for over voltage relay 32 in all of the systems of our invention which have been described to cause the voltage-reducing means to properly come into action.

Should it be desired, a combination of the initiating schemes of Figs. 7 and 8 may be effected by parallel connecting the contact members of relays 32' and 32''. This expedient will be justified only when the operating conditions or characteristics of the machine to be protected from over-voltage are unusual, as a consideration of the characteristics of the two separate devices will reveal.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. In combination, an electrical machine having a field winding, an exciter for energizing said winding, a field winding for said exciter, a source of energization for said exciter field winding, a reversing switch connected intermediate the exciter field winding and its source of energization, said switch having a normal-excitation polarity position and a reverse-excitation polarity position, means for biasing said switch to the normal-polarity position, a relay responsive to machine over-voltage, and means for actuating said switch to the reverse-polarity position upon the actuation of said relay.

2. In combination, an electrical machine having a field winding, an exciter for energizing said winding, a field winding for said exciter, a source of energization for said exciter-field winding, a reversing switch connected intermediate the exciter field winding and its source of energization, said switch having a normal-excitation-polarity position and a reverse-excitation polarity position, means for biasing said switch to the normal-polarity position, a relay responsive to machine over-voltages, means for actuating said switch to the reverse-polarity position upon the actuation of said relay, and a relay, responsive to a reduction of the machine field-winding current to a predeterminedly low value, disposed upon actuation to render ineffective said first named relay in its control of said reversing switch.

3. In combination with an electrical machine, a direct-current generator for supplying exciting current thereto, and means for exciting said generator, a system for preventing the voltage of said electrical machine from attaining excessive values comprising means for reducing the generator excitation and building it up in the reverse direction at a rate which is sufficiently rapid to counteract the maximum voltage-increasing influences to which the electrical machine may be subjected during abnormal conditions, and a relay responsive to machine overvoltage for controlling said excitation-adjusting means.

4. In combination with an electrical machine, an excitation-supply generator therefor, and exciting means for said generator, a system for preventing the voltage of said machine from attaining excessive values comprising means for reducing the generator excitation and building it up in the reverse direction at a rate sufficiently rapid to counter-act the maximum voltage-increasing influences to which the machine may be subjected, and means responsive to an abnormal condition of said machine for controlling said excitation-adjusting means.

5. In a system comprising an electrical machine, an excitation-supply generator therefor, exciting means for said generator, means responsive to machine overvoltage for rapidly reducing the generator excitation and building it up in the reverse direction, and means responsive to a reduction of the machine excitation to a predeterminedly low value for rendering ineffective said overvoltage responsive means.

6. In a system comprising an electrical machine, excitation-supply means therefor, means responsive to an abnormal condition of said machine for rapidly reducing the machine excitation, and means responsive to a reduction of said excitation to a predeterminedly low value for rendering ineffective said abnormal-condition responsive means.

JOHN H. ASHBAUGH.
ALEXANDER C. MONTEITH.